Figure 1:
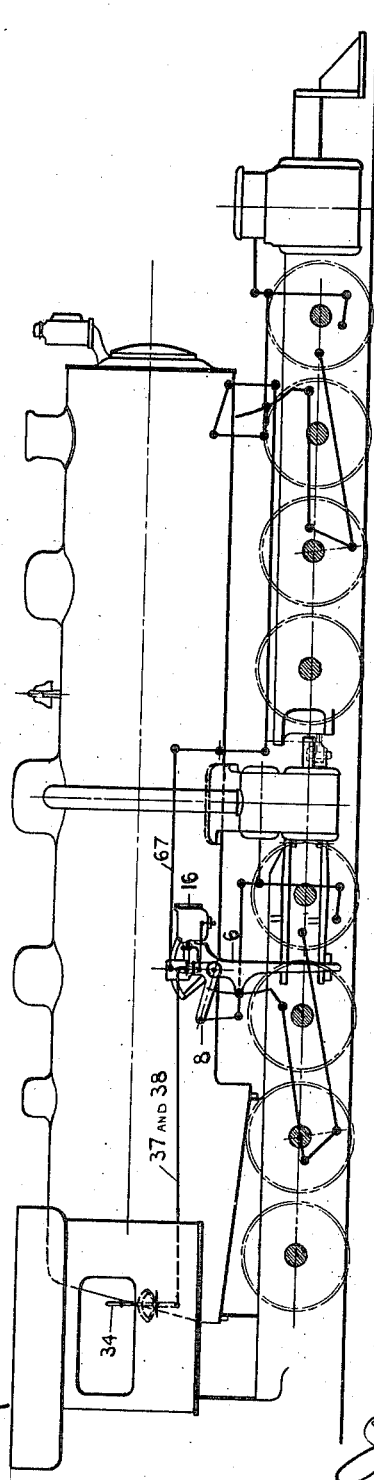

C. L. HEISLER.
VALVE REVERSING GEAR.
APPLICATION FILED AUG. 19, 1910.

1,036,842.

Patented Aug. 27, 1912.
7 SHEETS—SHEET 1.

WITNESSES:
Anders Wennerberg
Friedrich Böckel

INVENTOR
Charles L. Heisler
ATTORNEY

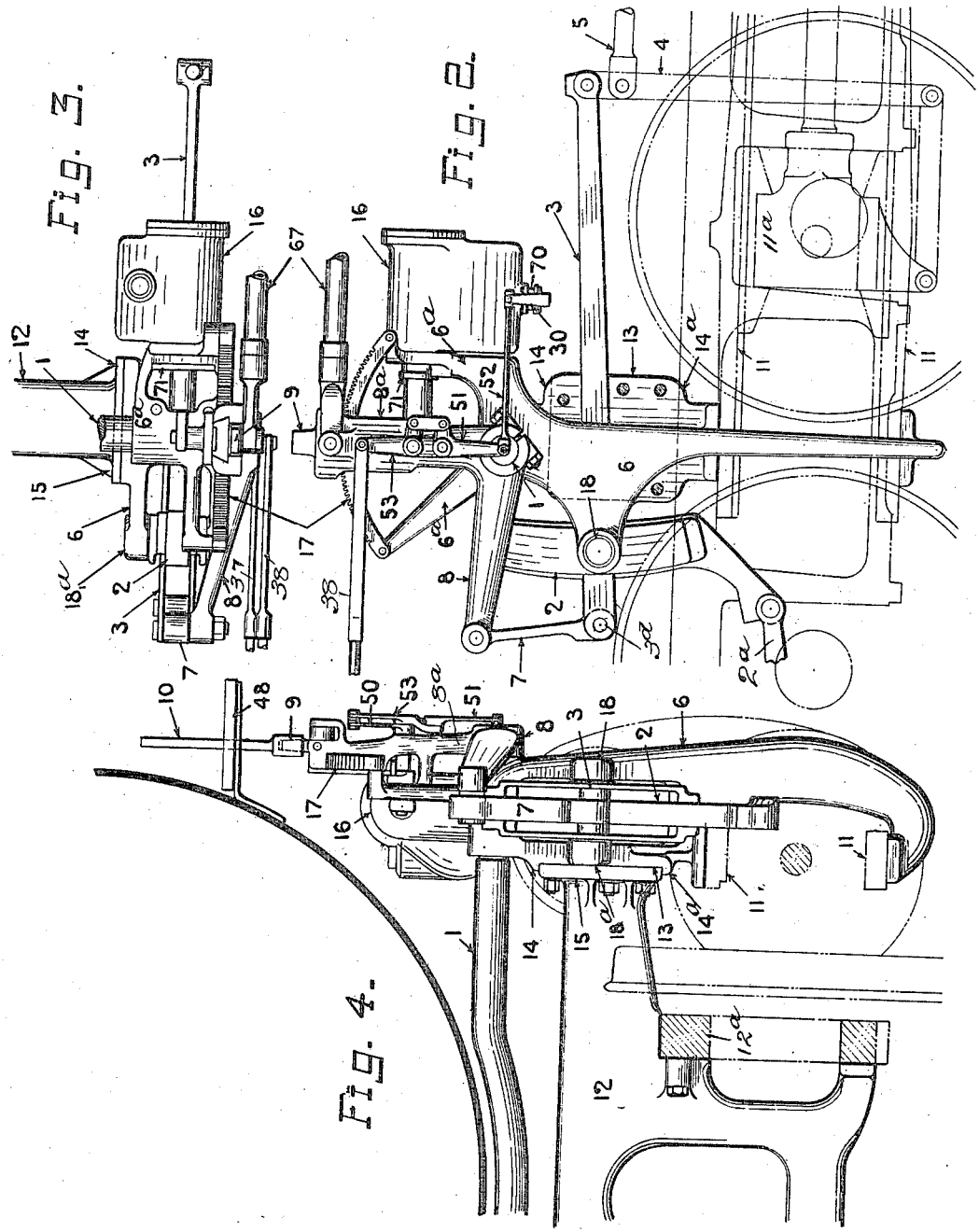

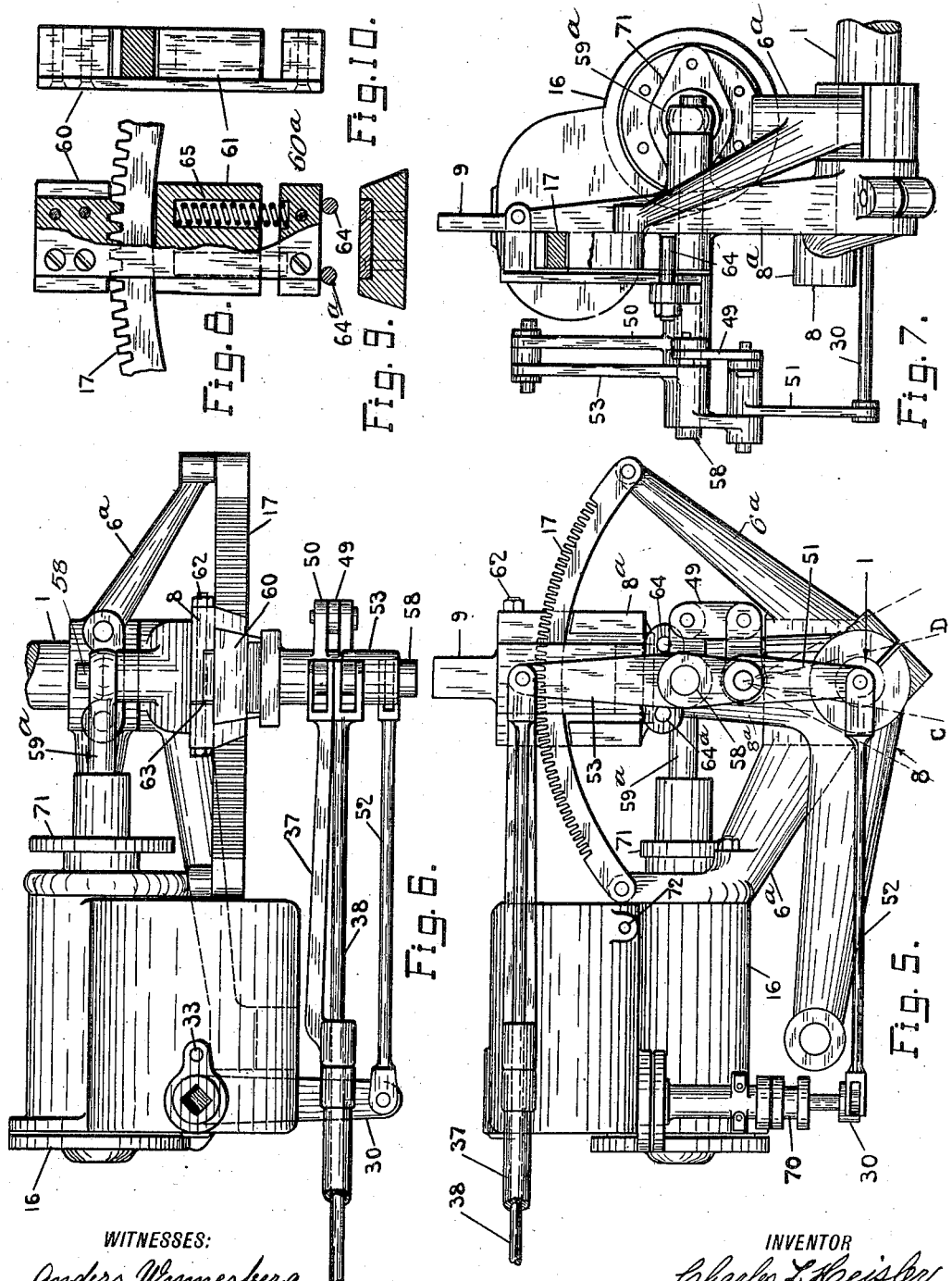

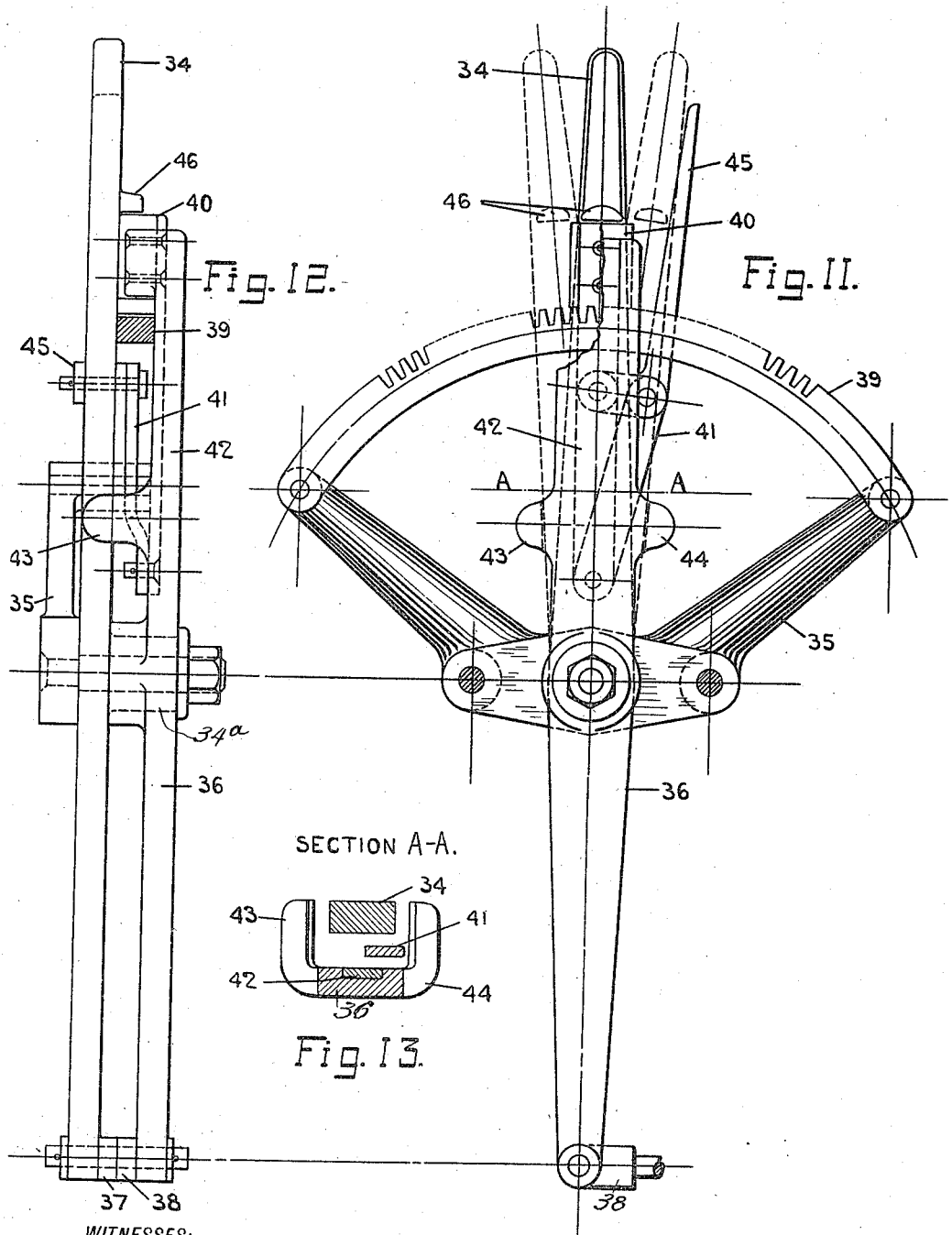

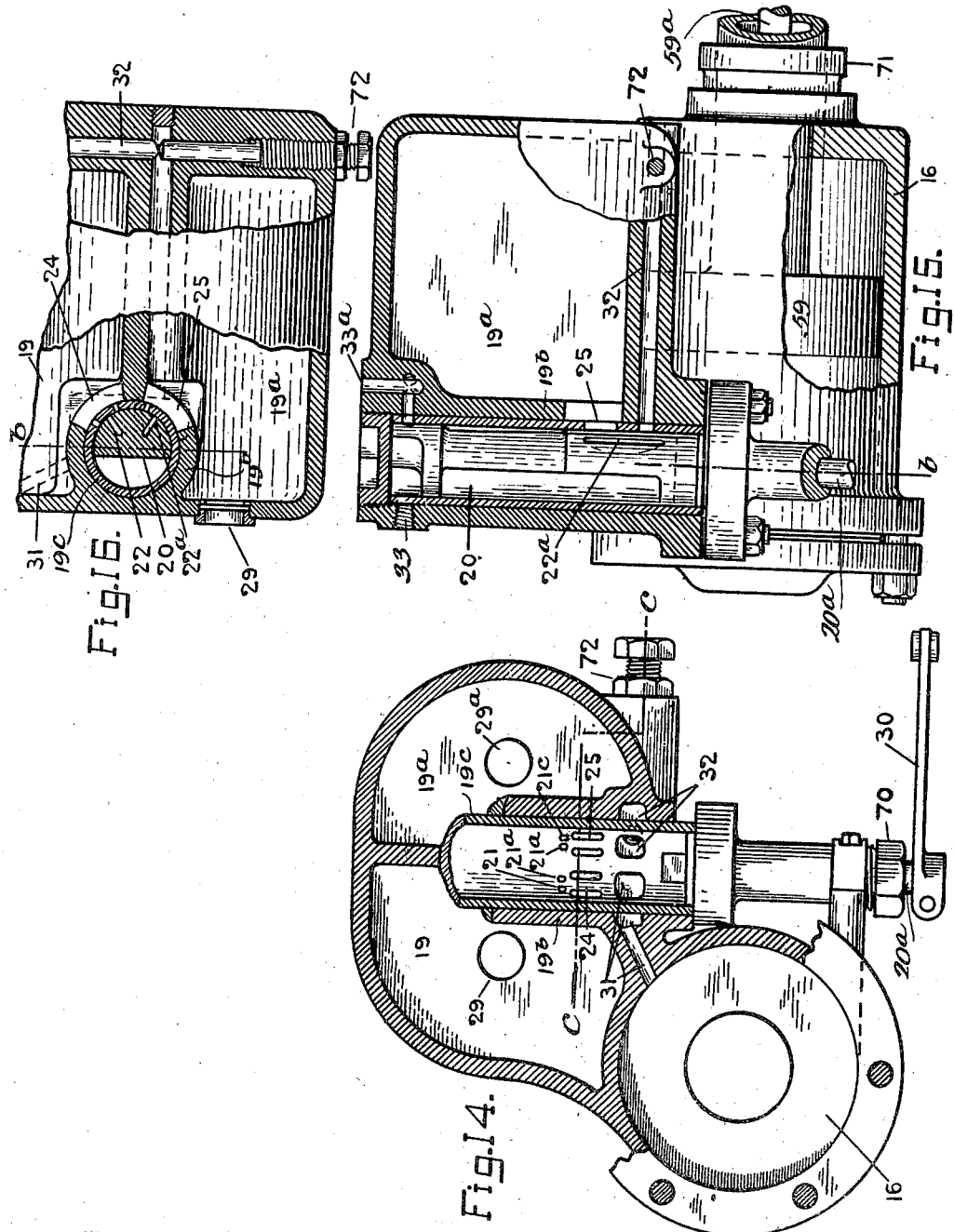

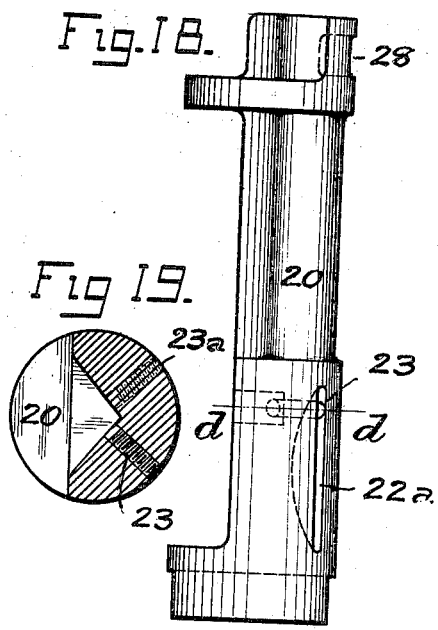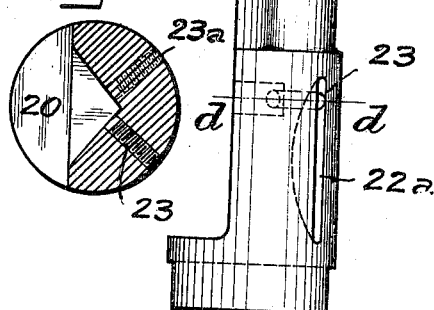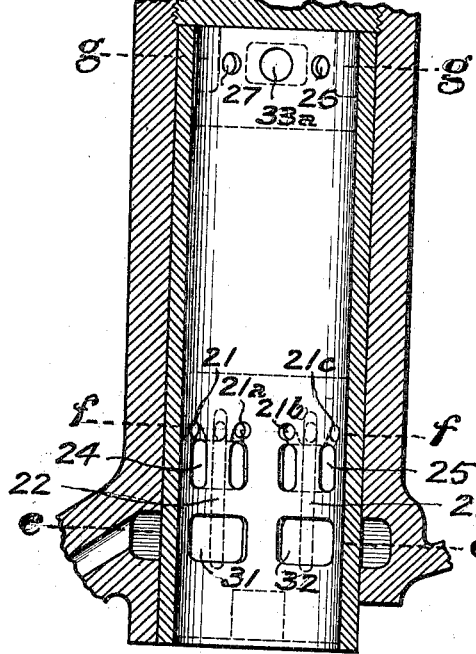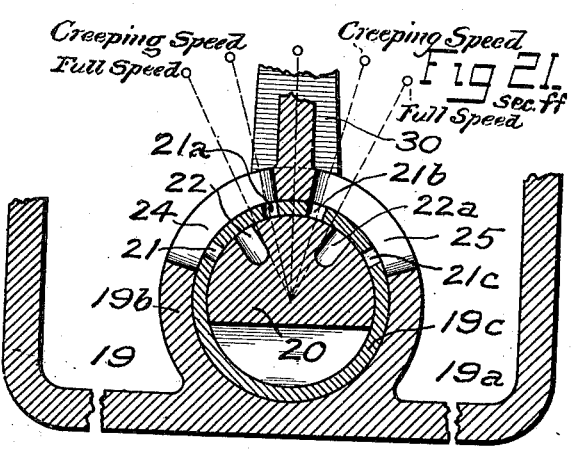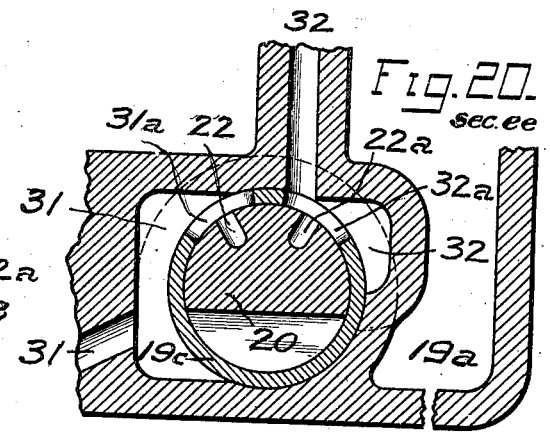

C. L. HEISLER.
VALVE REVERSING GEAR.
APPLICATION FILED AUG. 19, 1910.
1,036,842.
Patented Aug. 27, 1912.
7 SHEETS—SHEET 7.
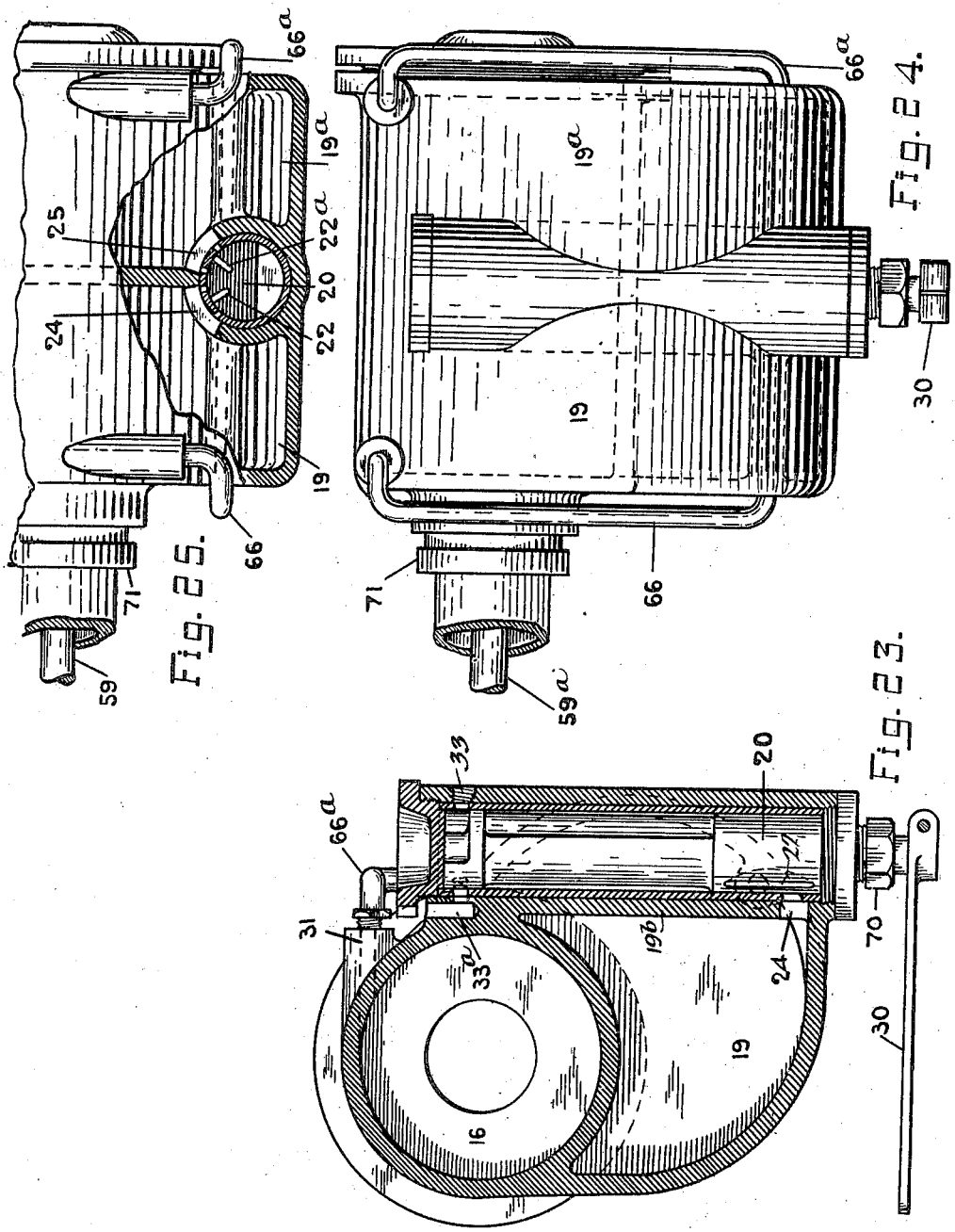
WITNESSES:
Anders Wennerberg
Friedrich Böckel
INVENTOR
Charles L. Heisler,
ATTORNEY

UNITED STATES PATENT OFFICE.

CHARLES L. HEISLER, OF SCHENECTADY, NEW YORK.

VALVE-REVERSING GEAR.

1,036,842.   Specification of Letters Patent.   Patented Aug. 27, 1912.

Application filed August 19, 1910. Serial No. 578,058.

*To all whom it may concern:*

Be it known that I, CHARLES L. HEISLER, of Schenectady, in the county of Schenectady and State of New York, have invented a certain new and useful Improvement in Valve-Reversing Gear, of which improvement the following is a specification.

My invention relates to power actuated reversing gears for locomotive and other engines, and its object is to simplify and perfect the construction of mechanisms of such type, and to provide means whereby a greater degree of refinement in the adjustment of desired points of cut off may be attained, and the perfect control of the valve gear be effected, with the exertion of a lesser degree of effort and attention on the part of the engineer than in the operation of devices heretofore ordinarily employed.

The improvement claimed is hereinafter fully set forth.

In properly controlling and adjusting the valve gear of locomotive and other engines, it frequently becomes necessary to make comparatively slight changes in the point of cut off, which changes, in some cases, may require an adjustment equivalent to the movement of the reverse lever only from one to the next notch of the quadrant. Difficulty is often experienced in endeavoring to make such small adjustments with the prior forms of power reversing gears, by reason of the fact that their construction is such as to necessitate a movement of the reverse lever and reversing cylinder piston corresponding to the closing movement of the valve of the reversing cylinder, and consequently, as in the case of any slow moving motor of similar construction, the mechanism becomes inactive or inoperative when said valve closes the reversing cylinder port, and until it is in mid position. The amount of uncontrolled movement or "loaf" covered by such inactivity is measured by the total length of the necessary lap of the valve. It is obvious that, in order to effect perfect control by a power reversing mechanism, it must move its reversing cylinder valve to the mid position, independently of the movement of its own piston, or that of the main reverse shaft to which it may be connected. My invention is primarily designed to effect this operation, as well as to lock and unlock the main reverse shaft by the same independent movement which closes or opens the reversing cylinder valve port, thereby affording a perfect control, absolutely secure locking, and the maximum degree of refinement and ease of adjustment.

In the accompanying drawings: Figure 1 is a diagrammatic side view of an articulated compound locomotive, illustrating an application of my invention; Fig. 2, a side view, in elevation, of a reversing gear embodying my invention, mounted upon the guide yoke of a locomotive; Fig. 3, a plan or top view of the same; Fig. 4, a rear end view; Figs. 5, 6, and 7, side, plan and rear end views, respectively, on an enlarged scale, of the reversing mechanism; Figs. 8, 9, and 10, detail views of the latch block for the main quadrant; Fig. 11, a side view of the engineer's operating levers; Fig. 12, a rear view of the same; Fig. 13, a horizontal section, on the line A A of Fig. 11; Fig. 14, a transverse section through the liquid reservoirs, the casing of the valve for controlling flow therefrom, and the reversing cylinder, on the line $b\ b$ of Figs. 15 and 16; Fig. 15, a longitudinal section through one of the liquid reservoirs and the casing of the valve for controlling the flow therefrom, showing the reversing cylinder partly in elevation and partly in section; Fig. 16, a horizontal section through said reservoirs and valve casing, on the line $c\ c$ of Fig. 14; Fig. 17, a view, in elevation, of the port face or inside face of the bushing in which the controlling valve of the reversing cylinder operates; Fig. 18, a side view, in elevation, of said valve; Fig. 19, a transverse section through the same, on the line $d\ d$ of Fig. 18; Figs. 20, 21, and 22, transverse sections through said valve and its casing, on the lines $e\ e$, $f, f$, and $g\ g$, respectively, of Fig. 17; Fig. 23, a transverse section through a liquid reservoir and a reversing cylinder, and a longitudinal section through the casing of the controlling valve, showing a structural modification in which the liquid reservoirs are located below the reversing cylinder to suit particular location and requirements of installation; Fig. 24, a side view, in elevation, of the construction shown in Fig. 23; and Fig. 25, a plan view, partly in horizontal section.

My invention is herein exemplified as applied in a locomotive engine fitted with the well known Walschaert valve gear, but is, without variation of structural or operative principle, equally applicable in connection with the link motion and other valve gears heretofore employed. Referring to the drawings, the Walschaert valve gear shown comprises the ordinary link, 2, actuated by the eccentric crank rod, 2ª, coupled to its lower end, radius bar, 3, and combination lever, 4, coupled, at its upper end, to the radius bar, and adjacent thereto, to the stem, 5, of the distribution valve on the side of the locomotive nearer the observer, and coupled, at its lower end, to the cross head, 11ª, in the usual manner. After passing through the guide yoke, 6, which supports the cross head guide bars, 11, 11, and through the link, 2, the radius bar, 3, is coupled, by a link, 7, to a reverse arm, 8, fixed on the reverse shaft, 1, of the locomotive. In the instance shown, the arm, 8, is formed integral with an upwardly projecting arm, 8ª, the two constituting a bell crank, and the arm, 8ª, carries on its upper end a rectangular projection, 9, fitting a socket in the lower end of an emergency reverse lever, 10, projecting above the running board, 48, and provided for the purpose of enabling the reversal of the engine to be effected manually, in the event of breakage or derangement of the power reversing mechanism constituting my invention, which will be hereinafter fully described.

The guide yoke, 6, is secured to the main frame cross tie, 12, by means of a vertical pad, 13, formed on the guide yoke and disposed parallel with the track and cross head guides. To prevent excessive bolting stress, due to strains from the cross head, the bolting face of the pad, 13, is located vertically and as directly as possible above the guides, and the stress is further reduced by the gibs, 14, 14ª. The cross tie, 12, projects outwardly beyond the right hand frame member, 12ª, and is provided with end flanges, 15, which match the gibbed bolting faces of the guide yoke. This construction provides a rigid and substantial support for a reversing cylinder, 16, and its accessories, hereinafter to be described, which, with a main quadrant, 17, are mounted on the guide yoke. Link trunnion bearings, 18, 18ª, are formed on the rear side of the guide yoke, and it is preferably made in two parts by dividing it in a horizontal plane passing through the axis of the reverse shaft, 1, so that, as shown in Figs. 2 to 7, it is provided with a removable upper section, 6ª.

The entire reversing gear proper, comprising the reversing cylinder, 16, liquid reservoirs, 19, 19ª, reverse shaft and its arms, main quadrant, 17, and their related members, is mounted on the guide yoke 6, and constitutes a simple, compact, and self contained unit, which is not affected by the expansion or springing of parts, is independent of the boiler, and is free from distorting influences to which the older mechanisms are subjected. It is consequently adapted to enable more precise and perfect movement to be imparted to the steam distribution valves of the locomotive or other engine on which it is applied, thereby insuring better steam economy and lower cost of maintenance, with resultant higher commercial efficiency.

The movements of the reverse shaft, 1, and its arms, 8, by which the radius bars, 3, of the valve gears on each side of the locomotive, are raised and lowered into and from the various positions required in the reversal of the direction of movement of the locomotive and the adjustment of the point of cut off, are effected and controlled by the action of air or other elastic fluid under pressure upon inelastic liquid contained in two reservoirs adapted to be put into communication with the reversing cylinder, 16, within which a piston, 59, is fitted to reciprocate, the flow of liquid to and from the reversing cylinder being governed by an oscillatory valve, 20, manually operated by the engineer, through intermediate connections with a controlling reverse or lap lever, 34, in the cab of the locomotive, and also actuated by the movement of the piston, 59.

The relation of the reversing cylinder, 16, piston, 59, controlling valve, 20, and liquid reservoirs, 19, 19ª, as hereinafter described, is such that liquid will flow from one side of the piston, 59, into the corresponding reservoir, 19 or 19ª, when the air pressure admitted through the upper end of the valve, 20, acts upon the liquid in the other reservoir, and forces an equal amount of liquid against the opposite side of the piston; thereby causing the piston to move in the desired direction, at a speed depending upon the amount of air pressure and port opening at the lower end of the valve, 20, through which the liquid must flow. When a reversal of motion is desired, the valve, 20, effects a reversal in the direction of flow between the reservoirs and corresponding ends of the reversing cylinder; each time admitting air pressure on the top of the liquid in one reservoir, and permitting air to discharge from the top of the liquid in the other reservoir. Excepting for leakage, the total amount of liquid is always the same. The reversing cylinder always remains full of liquid, and each liquid reservoir contains a variable amount which depends upon the position of the piston in the reversing cylinder.

As shown in Figs. 14, 15, and 16, the reversing cylinder, 16, is cast integral with, and located below, two liquid reservoirs, 19, 19ª, set side by side, and a controlling valve casing, 19ᵇ, placed vertically at one end of the liquid reservoirs. The capacity of each of the liquid reservoirs is substantially greater than the displacement of the piston, 59, of the reversing cylinder, in order that the latter may always be kept full of liquid on both sides of the piston. The valve casing, 19$^b$, is lined with a cylindrical bushing, 19$^c$, through the upper portion of which, and through the casing, a pressure supply port, 33, is formed, said port being connected by a pipe with a source of supply of elastic fluid under pressure, which is preferably, though not necessarily, compressed air, this being readily available in locomotives, and for facility of description, will be herein referred to as being the actuating fluid pressure medium employed. An exhaust port, 33$^a$, extends through the bushing and casing, opposite the supply port, 33, and air ports, 27 and 26, extend from the interior of the bushing to the liquid reservoirs, 19 and 19$^a$, respectively, on opposite sides of the exhaust port, 33$^a$. The following ports also extend through the bushing and casing, at successively lower levels, viz: "creeping ports", 21, 21$^a$, leading from the liquid reservoir, 19, to the interior of the valve bushing, 19$^c$, and "creeping ports", 21$^b$, 21$^c$, leading from the liquid reservoir, 19$^a$, to the interior of said bushing, all of said ports being located in the same horizontal plane; liquid ports, 24 and 25, leading, respectively, from the liquid reservoir, 19, and the liquid reservoir, 19$^a$, to the interior of the valve bushing; and cylinder ports, 31 and 32, leading from the interior of the valve bushing to opposite ends of the reversing cylinder, 16. An adjustable choke plug, 72, which has a threaded engagement with the wall of one of the liquid reservoirs, projects into the cylinder port, 32, and is provided for limiting the maximum speed of the piston of the reversing cylinder. It was found that when the ports in the lower end of the valve, 20, and its seat, were made sufficiently large to give the desired maximum speed to the piston in the reversing cylinder, they did not provide an easy means for speed adjustment at the desired minimum or "creeping" speeds, for the reason that a very slight movement of the valve would give too large a port opening, and so high a degree of perfection in workmanship and maintenance was required that the use of such ports on a locomotive was not desirable. To obviate the difficulty, the auxiliary set of very small or "creeping" ports, 21, 21$^a$, 21$^b$, and 21$^c$, above specified, which are placed adjacent to the larger ports, 24 and 25, respectively, are provided. The creeping ports open into the same passages, and have the same functions, as the larger ports, with the exception that their small size causes the piston to move very slowly for a given valve movement. Narrow "creeping" ports or slots cut at right angles into the larger ports would perform the same functions. Because of their relative position, the creeping ports are always opened first and closed last by the valve, 20.

The location of the liquid ports, 31 and 32, at the top of the reversing cylinder, and of the air ports, 26 and 27, at the top of the valve casing, prevents air from being trapped into the reversing cylinder. Air under pressure supplied through either of the ports, 26 and 27, acts upon the top of the liquid in the reservoir to which it is admitted, and forces said liquid into the cylinder, thereby exerting its pressure on the side of the piston thereof against which it is applied. Peep glasses, 29, are fixed in the liquid reservoirs, to indicate the lowest permissible liquid level therein.

Longitudinal recesses or cavities, 22 and 22$^a$, are formed in the face of the controlling valve, 20, adjacent to its lower end, the cavity, 22, being continuously in communication with the cylinder port, 31, and adapted to establish communication between said port and the liquid port, 24, and the cavity, 22$^a$, being continuously in communication with the cylinder port, 32, and adapted to establish communication between said port and the liquid port, 25. Adjusting screws, 23 and 23$^a$, are fitted in the valve, 20, in the plane of the creeping ports, for the purpose of regulating the rapidity of the flow of liquid through said ports, so that the piston speed for the creeping positions may be reduced to a desired minimum. A recess or cavity, 28, is formed in the face of the valve, 20, adjacent to its upper end, said recess being continuously in communication with the exhaust port, 33$^a$, and establishing communication between said exhaust port and the liquid reservoir, 19, for exhaust from the latter, through the port, 27, or establishing communication between said port and the liquid reservoir, 19$^a$, for exhaust from the latter, through the port, 26, accordingly as the valve may be moved into one or the other of its operating positions. The valve, 20, is fixed upon a stem, 20$^a$, carrying an arm, 30, which is coupled, by a floating rod, 52, bell crank lever 51, link, 49, lap arm, 50, and reach rods, 37 and 38, with a controlling reverse or lap lever, 34, and latch lever, 36, in the cab of the locomotive.

The air ports, 26 and 27, are opened earlier by the valve, 20, and are closed later, than any of the lower liquid ports. The air ports admit the necessary supply of operating power in all positions of the valve relatively to the liquid ports, which control the movements of the piston, the air ports acting as pressure supply throttles to provide for the supply of the proper amount of power at the proper times. When the valve is in mid or closed position, all ports are closed against air or other elastic fluid pressure at the upper end of the valve and liquid pressure at the lower end. When the valve lever, 30, is moved to one of the two "creeping" positions, indicated in Fig. 21, the valve cavity, 22, will register with the creeping port, 21$^a$, and cylinder port, 31, or the valve cavity, 22$^a$, with the creeping port, 21$^b$, and cylinder port, 32, as the case may be. In such position of the valve, there will be considerable lead or opening of the corresponding air ports, 27 and 26, to the supply port, 33, on one side, and to the exhaust port, 33$^a$, on the other. When it is desired to effect a greater speed of the reversing cylinder piston and of the connected reversing gear, the lever, 30, is moved toward full speed position in the direction desired and one or the other of the valve cavities, 22 or 22$^a$, is thereby brought into register with the liquid port, 32, or with the liquid port, 31, as the case may be, by which a more rapid flow of liquid under pressure to and from the opposite ends of the reversing cylinder is provided.

From the foregoing description, it will appear that the upper section of the valve, 20, supplies power to, and governs the direction of motion of, the piston, while the lower section of the valve merely controls the speed and prevents piston movement when closed. The construction substantially as above described, of controlling valve, fluid pressure supply and exhaust ports, smaller liquid "creeping" ports, and larger liquid ports for higher speed, together with the system of controlling levers and connections hereinafter described, provides for two separate and distinct speed movements, in addition to the range obtained by the adjustment of the creeping port screws, 23, 23$^a$, and the throttling of the liquid reservoir ports, 24 and 25, all of which are absolutely controlled by the engineer by the manipulation of the small controlling reverse or lap lever, 34, in the cab.

Referring to Figs. 11 to 13 inclusive, the reverse or lap lever, 34, is pivotally mounted upon a quadrant bracket, 35, to the top of which is fixed a toothed quadrant, 39, and a latch lever, 36, is pivoted on a hub, 34$^a$, projecting from the lever, 34, in the axial line of the pivotal bearing thereof. The lower ends of the levers, 36 and 34, are, respectively, coupled to independent reach rods, 37 and 38, which are preferably disposed one within the other as shown in Figs. 5 and 6, and the levers, 36 and 34, interlock when the piston of the reversing cylinder is moving at the higher or full speeds. When the controlling valve, 20, of the reversing cylinder, is placed in either creeping position, by the movement of its arm, 30, into one of the positions, C and D, indicated in Fig. 21, the latch lever, 36, is securely locked to the quadrant, 39, by a toothed latch block, 40, formed in or fixed to the upper arm of the latch lever. A latch handle, 45, is pivotally mounted on the lap lever, 34, and is connected by a link, 41, to the lower end of a latch block extension, 42, which is riveted, at its upper end, to the latch block 40, and is slidingly fitted in a groove in the latch lever, 36. Lugs, 44 and 43, formed on the front and rear sides of the latch lever, are provided to limit the movement of the lap lever, 34, relatively thereto. A stop lug, 46, is formed on the lap lever, 34, just above the level of the latch block, 40, when engaged with the quadrant, 39, to prevent the latch lever from being unlocked, except when the lap lever has previously been placed in one or the other of the creeping positions indicated in dotted lines in Fig. 11.

When the lap lever, 34, has been moved into either of the creeping positions, pressure on the latch handle, 45, will lift the latch block, 40, out of engagement with the quadrant, thereby permitting the latch lever to be moved, and placing the latch block in the path of the stop lug, 46, whereby the latch and lap levers are interlocked. Further movement of the lap lever will, through the connections previously specified, move the controlling valve, 30, into position to open one or the other of the larger liquid reservoir ports, 24 and 25, and impart to the reverse gear any desired speed up to a predetermined maximum.

Referring to Figs. 5 to 10 inclusive, the combination arm, 53, (which, together with the pivotally mounted bell crank, 51, constitutes an articulated floating member) and the bell crank, 50, are pivotally mounted upon a pin, 58, which projects from the vertical arm, 8$^a$, of the reverse shaft. The bell crank 50 is a supplementary floating member. The opposite end of the pin, 58, is coupled to the piston rod, 59$^a$, of the reversing cylinder, and the power requisite for reversing and adjusting the valve gear is thereby transmitted from the piston, 59, of the reversing cylinder, to the reverse shaft, 1. A latch block, 60, having teeth which engage the notches of the main quadrant, 17, which, as before stated, is supported on the guide yoke, 6, and a spring box, 61, located below the quadrant, are fitted to slide longitudinally on the upper arm, 8$^a$, of the reverse shaft, the latch block being provided with beveled edges, abutting against corresponding guide faces on the reverse arm. The reverse arm is formed with a spring slot, 63, and provided with a clamp bolt, 62, to take up wear of the latch block. Springs, 65, fitted in the spring box, 61, bear thereon and on a block, 60$^a$, which is fixed to the latch block, 60, and bears on two pins, 64, 64$^a$, projecting from the bell crank, 50, thereby normally holding the latch block and reverse arm, 8$^a$, in engagement with the main quadrant, 17. Under this construction, the first or "lap" movement of the lap lever, 34, in the cab, will release the reverse arm from the quadrant, inasmuch as the movement of the bell crank, 50, to the position indicated at C or D, Fig. 5, will lift the latch block by the resultant upward movement of the pin, $64^a$ or 64, as the case may be. The same movement causes the reverse arm, $8^a$, to "creep" or swing slowly until the teeth of the latch block again coincide with the quadrant notches, thereby permitting the springs, 65, to lock the reverse shaft mechanism on the main quadrant, 17, with the lap lever, 34, bell crank, 50, and controlling valve, 20, in mid positions. This "creeping" lap movement is made without unlocking the latch lever, 36, in the cab, and is limited, in either direction, to one or two quadrant notches, in order to afford the refinement desired for operation in passenger or similar service.

In order to obtain a greater and more rapid movement, or a complete reversal of the valve gear, the lap lever, 34, is manipulated similarly to an ordinary reverse lever, very little effort on the part of the engineer being, however, required, since only the valve, 20, and the intermediate connections thereto, are required to be moved by him. As soon as the lap lever, 34, is moved to one of the positions indicated in dotted lines in Fig. 11, the latch lever, 36, is freed, and readily follows after the opening of the port, 24, or the port, 25, as the case may be. At any desired position of the reverse gear, the lap lever latch handle, 45, is freed, whereupon the valve, 20, is moved to creeping position, and when the teeth of the latch block, 60, again coincide with the quadrant notches, the springs, 65, lock the latch block, and the valve, 20, and lap lever, 34, are thrown into mid position. This movement securely locks the entire reverse mechanism at the reverse shaft arm, thereby eliminating the lost motion, springing of parts, and other objections which are present in the ordinary reversing gear, in which long and springy reach rods intervene between the valve gear and a locking mechanism consisting of quadrant notches located in the cab, which is sometimes fifteen to twenty five feet distant from the reverse shaft.

In the application of my improvement in locomotives having boilers of exceptionally large size, it may become necessary to locate the liquid reservoirs, 19, $19^a$, below the reversing cylinder, 16, as shown in Figs. 1 to 4 inclusive, and Figs. 23 to 25 inclusive. In such case, liquid conduits, 66, $66^a$, are provided, said conduits forming elongated cylinder ports leading from the ports, 31 and 32, at the ends of the reversing cylinder, to the valve casing, by which the pocketing of air back of the piston, which would cause a loss of control of the reverse gear, is prevented. The liquid reservoirs are connected at top with the air ports, 26 and 27, and at the bottom with the ports, 24 and 25, which are controlled by the valve, 20, as before described.

The cab quadrant, 39, is provided with the same number of notches as the main quadrant, 17, so that the position of the engineer's lap lever, 34, will always correspond with that of the reverse shaft arm, $8^a$. As shown in Figs. 2 to 7, inclusive, the pivotal connection of the bell crank, 51, and link, 52, is normally in the axial line of the reverse shaft, 1, and the valve, 20, is then in mid position. By the vertical location of the valve, 20, with its lower end submerged in oil, all air leakage is prevented by the sealing of the stuffing box, 70, with oil. The stuffing box, 71, of the piston rod of the reversing cylinder, is also oil sealed. Instead of providing separate creeping ports, as in the preferred construction illustrated, narrow slots, extending from the larger liquid reservoir ports, 24 and 25, may be used to perform the same function.

Assuming the mechanism to be in mid-gear, as shown in the drawings, the operation of the appliance is as follows: In order to move the valve gear into full forward position, the engineer moves the lap lever, 34, toward the right to the position shown by the right hand dotted lines in Fig. 11. This movement is transmitted, through the reach rod, 37; the elbow lever, 50; link, 49; floating bell crank, 51; floating rod, 52; and valve arm, 30, to the controlling valve, 20, which is moved toward the left to its creeping position, indicated in Fig. 21. When in this position, air, entering the pressure supply port, 33, at the top of the valve, is admitted to the liquid reservoir, $19^a$, by the port, 26, being brought into communication with the pressure supply port, and air is exhausted from the reservoir, 19, through the port, 27, and exhaust port, $33^a$, (see Fig. 22). The valve cavity, 22, near the lower end of the valve, 20, now communicates with the creeping port, 21, and the valve cavity, $22^a$, with the creeping port, $21^b$, which permits the liquid under air pressure in the reservoir, $19^a$, to slowly pass to the right hand end of the cylinder, 16, and the liquid on the left hand side of the piston, 59, of said cylinder, to flow into the reservoir, 19, from which the air is being exhausted. The piston, 59, is thereby moved slowly to the left for a short distance, as, say equivalent to one or two notches of the main quadrant, 17, Figs. 5 and 6. As previously described, a movement of the elbow lever, 50, to the right or the left from its mid position, in either case unlocks or lifts the main latch, 60, and the piston is consequently permitted to move the reverse arm, 8, downward, which is in the direction of forward gear.

The continued movement of the piston to the position of full forward gear is effected by pressing the latch handle, 45, so as to release the latch lever, 36, and interlock it with the lap lever, 34, upon which the two levers are moved together to the right toward full forward position. This movement, through the reach rod, 38; combination arm, 53; floating bell crank, 51; and floating rod, 52, moves the controlling valve, 20, to the left, (in the same direction as before), to full speed position, indicated by dotted lines in Fig. 21. When in this position, the valve cavity, 22, establishes communication between the ports, 24, and 31, and the cavity, 22ᵃ, establishes communication between the ports, 25, and, 32. A much more rapid flow of liquid is thereby permitted from the reservoir, 19ᵃ, into the right hand end of the cylinder, 16, through the port, 32, and from the left hand side of the piston of said cylinder, through the port, 31, into the reservoir, 19. Upon the release of the latch handle, 45, and lap lever, 34, the latch lever, 36, becomes instantly locked, and the valve, 20, is thereby moved at once to creeping position, in which it remains until the continued slow movement of the reverse shaft arm, 8, downward, and accompanying movement of the upper arm, 8ᵃ, toward the left in Fig. 5, causes the main latch, 60, to stand directly over the notches in the quadrant, 17, and the sudden downward movement of said latch moves the elbow lever, 50, to mid position. The lap lever, 34, and valve, 20, are thereby moved to mid position. The valve is then again in the position shown in the drawings, and the levers, 34, and 36, are in the same relative positions as shown in Fig. 11, but at the extreme right of the quadrant, 39. The arm, 8ᵃ, and the several levers, 53, 50, 49, and 51, will also be in the same relative positions, but would incline toward the left in Fig. 5. In order to move the valve gear to full backward position, from full forward or any other position, the lap lever, 34, is manipulated as before, except that its movement is to the left, to full back position on the quadrant, 39. The reverse arm, 8ᵃ, is then and thereby moved to the extreme right on the quadrant, 17, Fig. 6. As before indicated, it is not necessary to unlatch the latch lever, 36, when it is desired to move the reverse arm, 8ᵃ, one or two notches to the right or left from the position of the latch lever, as this can be done by merely moving the lap lever, 34, to the right or left dotted position, without manipulating the latch handle, 45. To move at slow speed through a considerable distance, or entire reversal, the lap lever, 34, is moved to one or the other dotted position, and the latch lever, 36, released. The latch lever is not forced, but is allowed to follow the slow movement of the reverse arm, 8, that is to say, the relative positions of the reverse arm, 8ᵃ, and the members, 50, 51, and 53, are not disturbed after the controlling valve has been moved to creeping position. A slight increase in speed will be obtained by slight pressure on the lap lever, 34, in the direction of its motion, and, in fact, any speed, from the minimum to the maximum, may be obtained in this manner.

Various structural modifications of the embodiment of my invention herein described and shown, may be made within the discretion of a constructor familiar with the subject matter to which it relates, without departure from its spirit and operative principle, and I do not therefore limit myself to the structure herein specifically set forth.

I claim as my invention and desire to secure by Letters Patent:

1. In a valve reverse gear, the combination of a cross head guide support, a power valve gear reversing mechanism attached thereto, a valve gear member coupled to said reversing mechanism, and manually operable means for controlling said reversing mechanism.

2. In a valve reverse gear, the combination of a cross head guide support, a power valve gear reversing mechanism attached thereto, a valve gear member coupled to said reversing mechanism, manually operable means for controlling said reversing mechanism, and manually operable means for locking said controlling means.

3. In a valve reverse gear, the combination of a cross head guide support, a power gear reversing mechanism attached thereto, a valve gear member coupled to said reversing mechanism, and a latch lever and quadrant for locking said controlling means.

4. In a valve reverse gear, the combination of a cross head guide support, a valve reversing mechanism attached thereto, a valve gear member coupled to said reversing mechanism, manually operable means for controlling said reversing mechanism, and a locking member attached to said support and engaging with the reversing mechanism for the purpose of locking it in any desired position.

5. In a valve reverse gear, the combination of a cross head guide support, a valve reversing mechanism attached thereto, a valve gear member coupled to said reversing mechanism, manually operable means for controlling said reversing mechanism, and manually operable members coupled thereto for locking said reversing mechanism.

6. In a valve reverse gear, the combination of a cross head guide support, a valve reversing mechanism attached thereto, a valve gear member coupled to said reversing mechanism, manually operable means for controlling said reversing mechanism, and a latch lever and quadrant coupled thereto for locking said reversing apparatus.

7. In a valve reverse gear, the combination of a cross head guide support, a valve reversing mechanism attached thereto, a valve gear member coupled to said reversing mechanism, manually operable means for controlling said reversing mechanism, manually operable means for locking said manual controlling means, and a second locking member coupled thereto and engaging with and locking the reversing mechanism.

8. In a valve gear reversing mechanism, the combination of a main frame cross tie having a vertical end flange disposed parallel with the main frame, a cross head guide yoke having a pad on one side abutting against and secured to said flange, a valve reversing appliance attached to said guide yoke, a valve gear member coupled to said reversing appliance, and manually operable means for controlling said reversing appliance.

9. In a valve gear reversing mechanism, the combination of a main frame cross tie, a cross head guide yoke secured thereto, a valve reversing apparatus attached to said cross tie and guide yoke, a valve gear member coupled to said reversing apparatus, and manually operable means for controlling said reversing apparatus.

10. In a locomotive valve reversing mechanism, the combination of a support for cross head guides, comprising two cross head guide yokes disposed on opposite sides of the locomotive, and a frame cross tie rigidly connecting said yokes, a reversing apparatus mounted thereon, a reverse shaft connected to said apparatus, valve gear members coupled to said reverse shaft, and manually operable means for controlling said reversing apparatus.

11. In a valve gear reversing mechanism, the combination of a cross head guide support, a reversing cylinder attached thereto, a piston reciprocating in said cylinder, a valve gear member coupled to the piston, and manually operable means for controlling the movements of the piston.

12. In a valve gear reversing mechanism, the combination of a cross head guide support, a reversing cylinder attached thereto, a piston reciprocating in said cylinder, a valve gear member coupled to the piston, manually operable means for controlling the movements of the piston, and manually operable means for locking said controlling means.

13. In a valve gear reversing mechanism, the combination of a cross head guide support, a reversing cylinder attached thereto, a piston reciprocating in said cylinder, a valve gear member coupled to the piston, manually operable means for controlling the movements of the piston, and a latch lever and quadrant for locking said controlling means.

14. In a valve gear reversing mechanism, the combination of a cross head guide support, a reversing cylinder attached thereto, a piston reciprocating in said cylinder, a valve gear member coupled to the piston, a control valve governing the application and release of pressure to and from opposite sides of the piston, and manually operable means for actuating said control valve.

15. In a valve gear reversing mechanism, the combination of a cross head guide support, a reversing cylinder attached thereto, a piston reciprocating in said cylinder, an oscillatory reverse shaft journaled in bearings on the guide support and coupled to the piston, and manually operable means for controlling the movements of the piston.

16. In a valve gear reversing mechanism, the combination of a cross head guide support, a reversing cylinder attached thereto, a piston reciprocating in said cylinder, a link mounted in bearings on the guide support, a radius bar traversing in said link, intermediate connections coupling the radius bar to the piston, and manually operable means for controlling the movements of the piston.

17. In a valve gear reversing mechanism, the combination of a main frame cross tie having a vertical end flange, a cross head guide yoke having a pad on one side abutting against and secured to said flange, a reversing cylinder attached to the guide yoke above said pad, a piston reciprocating in said cylinder, a valve gear member coupled to the piston, and manually operable means for controlling the movements of the piston.

18. In a valve gear reversing mechanism, the combination of a main frame cross tie having a vertical end flange, a cross head guide yoke having a pad on one side abutting against and secured to said flange, a gib formed on said pad and engaging the flange of the cross tie, a reversing cylinder attached to the guide yoke above said pad, a piston reciprocating in said cylinder, a valve gear member coupled to the piston, and manually operable means for controlling the movements of the piston.

19. In a valve gear reversing mechanism, the combination of a reversing cylinder, a piston reciprocating therein, two liquid reservoirs communicating by ports with opposite ends of the reversing cylinder, means controlling said ports and controlling communication between said reservoirs and a source of fluid pressure supply, manually operable means for actuating said controlling means, and a valve gear member coupled to the piston.

20. In a valve gear reversing mechanism, the combination of a reversing cylinder, a piston reciprocating therein, two liquid reservoirs communicating, by ports, with opposite ends of the reversing cylinder, a control valve governing said ports and also controlling communication between said reservoirs and a source of fluid pressure supply, manually operative means for actuating said control valve, and a valve gear member coupled to the piston.

21. In a valve gear reversing mechanism, the combination of a reversing cylinder, a piston reciprocating therein, two liquid reservoirs communicating by ports with opposite ends of the reversing cylinder, a control valve governing said ports and also controlling communication between said reservoirs and a source of fluid pressure supply, a manually operable lever and connections for actuating said control valve, a valve gear member coupled to the piston, and an independent manually operable lever and connections for moving the control valve independently of the movement of the valve gear member.

22. In a valve gear reversing mechanism, the combination of a reversing cylinder, a piston reciprocating therein, two liquid reservoirs communicating by ports with opposite ends of the reversing cylinder, a control valve governing said ports and also controlling communication between said reservoirs and a source of fluid pressure supply, a manually operable lever and connections for actuating said control valve, a valve gear member coupled to the piston, an independent manually operable lever and connections for moving the control valve independently of the movement of the valve gear member, and a locking device for holding the levers in desired position.

23. In a valve reverse gear, the combination of a reversing motor, a valve controlling the supply and exhaust of motive fluid to and from said motor, manually operable means for controlling said valve, a reverse shaft coupled to the motor, and automatically operating means interposed between said valve and said reverse shaft for moving said valve to its mid or neutral position independently of the movement of the reverse shaft.

24. In a valve reverse gear, the combination of a reversing motor, a valve controlling the supply and exhaust of motive fluid to and from said motor, manually operable means for controlling said valve, a reverse shaft coupled to the motor, automatically operated means interposed between said valve and said reverse shaft for moving said valve to its mid or neutral position independently of the movement of the reverse shaft, and means connecting said valve controlling means and said valve moving means.

25. In a valve reverse gear, the combination of a reversing motor, a valve controlling the supply and exhaust of motive fluid to and from said motor, manually operable members for controlling said valve, a reverse shaft coupled to the motor, automatically operating means interposed between said valve and said reverse shaft for moving said valve to its mid or neutral position independently of the movement of the reverse shaft, and means for locking the reverse shaft when said shaft has reached a position corresponding to a selected setting of the said manually operative controlling members.

26. In a valve reverse gear, the combination of a reversing motor, a reverse shaft coupled thereto, members for controlling said motor, coupled members connecting said motor with said controlling members, a locking latch and quadrant coupled to said reverse shaft, automatically operating means coupled thereto for locking said latch for each selected setting of said controlling members, and coupled members interposed between said controlling members and said latch for unlocking it when changing to a new setting.

27. In a valve reversing mechanism, the combination of a reversing motor, a valve controlling the supply and exhaust of motive fluid to and from said motor, manually operable means for controlling said valve, comprising a plurality of reach rods and connected hand levers, a reverse shaft coupled to the motor, and connected members interposed between said valve and the controlling means for moving said valve to or from its closed mid or neutral position independently of the movement of the reverse shaft.

28. In a valve reverse gear, the combination of a reversing motor, a valve controlling the supply and exhaust of motive fluid to and from said motor, manually operable means for controlling said valve, comprising a pair of reach rods located one within the other and connected hand levers, a reverse shaft coupled to the motor, and means for moving said valve to and from its closed mid or neutral position independently of the movement of the reverse shaft.

29. In a valve reverse gear, the combination of a reversing motor, means for controlling the supply and exhaust of motive fluid, a quadrant and a main locking member engaging therewith, a reversing member coupled to the motor, manually operable means coupled to the fluid controlling means, and comprising a lap lever, a latch handle pivoted thereon, a supplementary quadrant, a latch lever, a supplementary latch mounted thereon and coupled to the latch handle and engaging the supplementary quadrant for locking the latch lever, and coupling means interposed between the main locking member and the lap lever for unlocking said member.

30. In a valve reverse gear, the combination of a reversing motor, means for controlling the supply and exhaust of motive fluid, a quadrant and a main locking member engaging therewith, a reversing member coupled to the motor, manually operable means coupled to the fluid controlling means, and comprising a lap lever, a latch handle pivoted thereon, a supplementary quadrant, a latch lever, a supplementary latch mounted thereon and coupled to the latch handle and engaging the supplementary quadrant for locking the latch lever, coupling means interposed between the main locking member and the lap lever for unlocking said member, a pivotal bearing common to the lap and latch levers, and stops adapted to engage with the lap and latch levers, whereby the lap lever is given a limited degree of movement independent of the latch lever.

31. In a valve reverse gear, the combination of a reversing motor, means for controlling the supply and exhaust of motive fluid, a quadrant and a main locking member engaging therewith, a reversing member coupled to the motor, manually operable means coupled to the fluid controlling means, and comprising a lap lever, a latch handle pivoted thereon, a supplementary quadrant, a latch lever, a supplementary latch mounted thereon and coupled to the latch handle and engaging the supplementary quadrant for locking the latch lever, coupling means interposed between the main locking member and the lap lever for unlocking said member, and a stop attached to the lap lever and adapted to lock the latch lever when the lap lever is in its mid position relatively to the latch lever.

32. In a valve reverse gear, the combination of a motor, manually operable controlling means coupled thereto, a reversing member coupled to the motor, floating members pivotally mounted on said reversing member, a locking member, and a fixed notched member with which said locking member is adapted to engage when the reversing member coincides in position with a selected setting of the controlling means, by a movement substantially perpendicular to that of the reversing member at the point of engagement.

33. In a valve reverse gear, the combination of a motor, manually operable controlling means coupled thereto, a reversing member coupled to the motor, floating members pivotally mounted on said reversing member, a guide fixed to the reversing member, and extending in a direction radially from the axis of the movement of the reversing member, a locking member sliding in said guide, and a fixed notched member with which said locking member is adapted to engage when the reversing member coincides in position with a selected setting of the controlling means.

34. In a valve reverse gear, the combination of a motor, manually operable controlling means coupled thereto, a reversing member coupled to the motor, said reversing member comprising a bell crank formed on a reverse shaft, floating members pivotally mounted on one arm of the bell crank, a locking member also mounted on said arm, and a fixed notched member with which said locking member is adapted to engage, when the reversing member coincides in position with a selected setting of the controlling means, by a movement substantially perpendicular to that of the reversing member at the point of engagement.

35. In a valve reverse gear, the combination of a motor, manually operable controlling means coupled thereto, a reversing member coupled to the motor, floating members pivotally mounted on said reversing member and comprising a two section articulated member, the upper section of which is connected to the manually operable controlling means, and the lower section is in the form of a bell crank, and a supplementary member coupled to the bell crank section, a locking member coupled to the supplementary member and to the manually operable controlling means, and a fixed notched member with which said locking member is adapted to engage.

36. In a valve reverse gear, the combination of a reversing cylinder, a piston reciprocating therein, ports communicating with opposite ends of the cylinder and with a source of fluid supply, and comprising main ports and communicating adjacent creeping ports, a manually operable control valve governing said ports, and a valve gear member coupled to the piston.

37. In a valve reverse gear, the combination of a reversing cylinder, a piston reciprocating therein, ports communicating with opposite ends of the cylinder and with a source of fluid supply, and comprising main ports and communicating adjacent creeping ports, means for adjusting the capacity of said ports, a manually operable control valve governing said ports, and a valve gear member coupled to the piston.

38. In a valve reverse gear, the combination of a reversing cylinder, a piston reciprocating therein, ports communicating with opposite ends of the cylinder and with a source of fluid supply, and comprising main ports and communicating adjacent creeping ports, a control valve governing said ports, manually operable means for actuating said control valve, comprising a lap lever and a latch lever, said lap lever being coupled to the control valve through a floating member whereby it governs the creeping ports, and said latch lever being also coupled, through floating members, to the control valve to govern the main ports, and a valve gear member coupled to the piston.

39. In a valve reverse gear, the combination of a reverse shaft, a reversing motor, a valve controlling the supply and exhaust of motive fluid, manually operable means coupled thereto, an oscillating member coupled to said motor, floating members pivotally mounted on said oscillating member and coupled to said valve and manually operable means, a bearing pivotally supporting said oscillating member, and a reach rod coupling said oscillating member to the reverse shaft.

40. In a valve reverse gear, the combination of a reverse shaft, a reversing cylinder, a piston reciprocating therein, a valve for controlling the supply and exhaust of motive fluid, manually operable means coupled thereto, a reversing oscillating lever, floating members pivotally mounted thereon and coupled to said manually operable means, a bearing pivotally supporting said oscillating lever at one end thereof, a reach rod coupling the other end thereof to said reverse shaft, and a member coupling said piston to the oscillating member at a point between the ends thereof, for the purpose of multiplying the motion of said piston when transmitted through the reach rod.

CHARLES L. HEISLER.

Witnesses:
 INEZ J. AVERILL,
 MARY E. WORTH.

---

Copies of this patent may be obtained for five cents each, by addressing the "Commissioner of Patents, Washington, D. C."